(12) United States Patent
McCarthy et al.

(10) Patent No.: US 6,757,762 B1
(45) Date of Patent: Jun. 29, 2004

(54) MULTI-MODE PROCESSOR BUS BRIDGE

(75) Inventors: Paul McCarthy, Commerce, MI (US); Christopher N. St. John, Plymouth, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/430,314

(22) Filed: Oct. 29, 1999

(51) Int. Cl.$^7$ ............................................. G06F 13/42
(52) U.S. Cl. ........................ 710/105; 710/310; 710/315
(58) Field of Search ............................... 710/105, 305, 710/306, 308–311, 313, 315, 109, 22, 46, 47, 52

(56) References Cited

U.S. PATENT DOCUMENTS

| | | | |
|---|---|---|---|
| 4,935,868 A | | 6/1990 | DuLac ........................ 364/200 |
| 4,935,894 A | | 6/1990 | Ternes et al. ................ 364/900 |
| 5,522,069 A | | 5/1996 | Bertone et al. ............. 395/650 |
| 5,535,341 A | * | 7/1996 | Shah et al. .................. 710/310 |
| 5,546,546 A | | 8/1996 | Bell et al. .................... 395/292 |
| 5,613,162 A | | 3/1997 | Kabenjian ................... 395/842 |
| 5,619,661 A | * | 4/1997 | Crews et al. ................ 710/119 |
| 5,621,902 A | | 4/1997 | Cases et al. ................ 395/309 |
| 5,623,697 A | | 4/1997 | Bland et al. ................ 395/842 |
| 5,644,729 A | * | 7/1997 | Amini et al. ................ 395/250 |
| 5,664,117 A | * | 9/1997 | Shah et al. .................. 710/100 |
| 5,664,197 A | | 9/1997 | Kardach et al. ............ 395/728 |
| 5,664,223 A | * | 9/1997 | Bender et al. ................ 710/22 |
| 5,678,064 A | | 10/1997 | Kulik et al. ................ 395/848 |
| 5,680,592 A | | 10/1997 | Priem .......................... 395/527 |
| 5,706,514 A | * | 1/1998 | Bonola ........................ 709/104 |
| 5,708,849 A | | 1/1998 | Coke et al. .................. 395/842 |
| 5,761,462 A | | 6/1998 | Neal et al. .................. 395/309 |
| 5,768,548 A | * | 6/1998 | Young et al. ................ 710/306 |
| 5,768,612 A | | 6/1998 | Nelson ........................ 395/800 |
| 5,778,235 A | | 7/1998 | Robertson ................... 395/728 |
| 5,778,236 A | * | 7/1998 | Gephardt et al. ........... 710/266 |
| 5,790,869 A | | 8/1998 | Melo et al. .................. 395/728 |
| 5,799,207 A | | 8/1998 | Wang et al. ................. 395/858 |
| 5,805,816 A | | 9/1998 | Picazo, Jr. et al. ...... 395/200.53 |
| 5,805,842 A | | 9/1998 | Nagaraj et al. ............. 395/306 |
| 5,809,261 A | | 9/1998 | Lambrecht ................. 395/308 |
| 5,835,733 A | | 11/1998 | Walsh et al. ................ 395/281 |
| 5,838,930 A | | 11/1998 | Harashima ................. 395/287 |
| 5,850,571 A | | 12/1998 | Odom et al. ................ 395/847 |
| 5,878,239 A | | 3/1999 | Furuta ........................ 395/309 |
| 5,878,272 A | | 3/1999 | Yanagisawa et al. ....... 395/823 |
| 5,884,027 A | | 3/1999 | Garbus et al. ........... 395/200.8 |
| 5,887,146 A | | 3/1999 | Baxter et al. ............... 395/284 |
| 5,937,206 A | * | 8/1999 | Nakamura ................... 710/22 |
| 5,978,866 A | * | 11/1999 | Nain ............................ 710/22 |
| 6,092,140 A | * | 7/2000 | Tausheck .................... 710/310 |
| 6,260,093 B1 | * | 7/2001 | Gehman et al. ............ 710/309 |

* cited by examiner

Primary Examiner—P. Austin Bradley
Assistant Examiner—X. Chung-Trans
(74) Attorney, Agent, or Firm—Lise A. Rode; Mark T. Starr; Michael B. Atlass

(57) ABSTRACT

A processor bus bridge includes a buffer space disposed between a first bus and a second bus. The first bus is operated in a first mode by a first processor and the second bus is operated in a second mode by a second processor. The first bus has an electrical structure which is different from the electrical structure of the second bus. The first mode may also differ from the second mode. The processor bus bridge has a protocol logic module disposed between the first processor and the second processor for controlling data transfer across the buffer space in the first and second modes. Thus, the bus bridge enables communications between dissimilar processor buses while increasing performance and reducing CPU overhead.

9 Claims, 2 Drawing Sheets

| Processor A OK to Send | Processor B OK to Send | Failure |
|---|---|---|
| ON | ON | No Failures |
| ON | OFF | B Send Data Overrun<br>A Recv Data Underrun<br>A not ready to recv |
| OFF | ON | A Send Data Overrun<br>B Recv Data Underrun |
| OFF | OFF | A or B sending when should be receiving |
|  |  |  |

Fig. 2

MULTI-MODE PROCESSOR BUS BRIDGE

BACKGROUND OF THE INVENTION

1. Field of the Invention

The invention relates to interprocessor communications. More specifically, the invention concerns enabling communications between dissimilar processor buses while increasing performance and reducing CPU overhead.

2. Background Art

Banks, credit unions and other financial institutions often image checks, deposit slips and other types of bank documents in order to process financial transactions efficiently. Document processing systems have therefore become quite prevalent in the industry. In the performance of these critical functions, document processing systems commonly contain multiple microprocessor elements that are responsible for performing different tasks within the machine. In addition to their individual processing responsibilities, these processor elements are often required to communicate with each other.

A common difficulty, however, arises when there is a need to communicate between processors operating on dissimilar buses. Typically, the respective tasks of processors in an embedded dual processor controller board will involve the processing of substantially dissimilar signals. Common schemes fail to adequately address this problem and do not incorporate the ability to allow direct memory access (DMA) to occur on the two dissimilar buses simultaneously. Approaches attempting to address this problem have resulted in complex board designs leading to increased costs and reduced performance.

Furthermore, it is often difficult to determine the source of an error when two processors are communicating via dissimilar buses. It is therefore also desirable to provide the ability to troubleshoot communication errors in these types of inter-processor configurations without significantly adding to costs.

SUMMARY OF THE INVENTION

In a first aspect of the invention, a processor bus bridge comprises a buffer space disposed between a first bus and a second bus. The first bus is operated in a first mode by a first processor and the second bus is operated in a second mode by a second processor. The first bus has an electrical structure which is different from the electrical structure of the second bus. The processor bus bridge also comprises a protocol logic module disposed between the first processor and the second processor for controlling data transfer across the buffer space in the first and second modes.

In a second aspect of the invention, a method for interprocessor communication comprises the steps of operating a first bus in a first mode, wherein the first bus is connected to a first processor and operating a second bus in a second mode. The second bus is connected to a second processor, wherein the first bus has an electrical structure which differs from the second bus. The method also comprises the step of transferring the data between the first processor and the second processor via the first bus, the second bus, and a processor bus bridge.

BRIEF DESCRIPTION OF THE DRAWINGS

The invention is set forth in exemplary fashion by the following detailed description of a preferred embodiment taken in conjunction with the drawing, in which:

FIG. 2 is a logic table of the operation of the diagnostic indicators in accordance with the principles of the invention.

DETAILED DESCRIPTION

Figure 1:
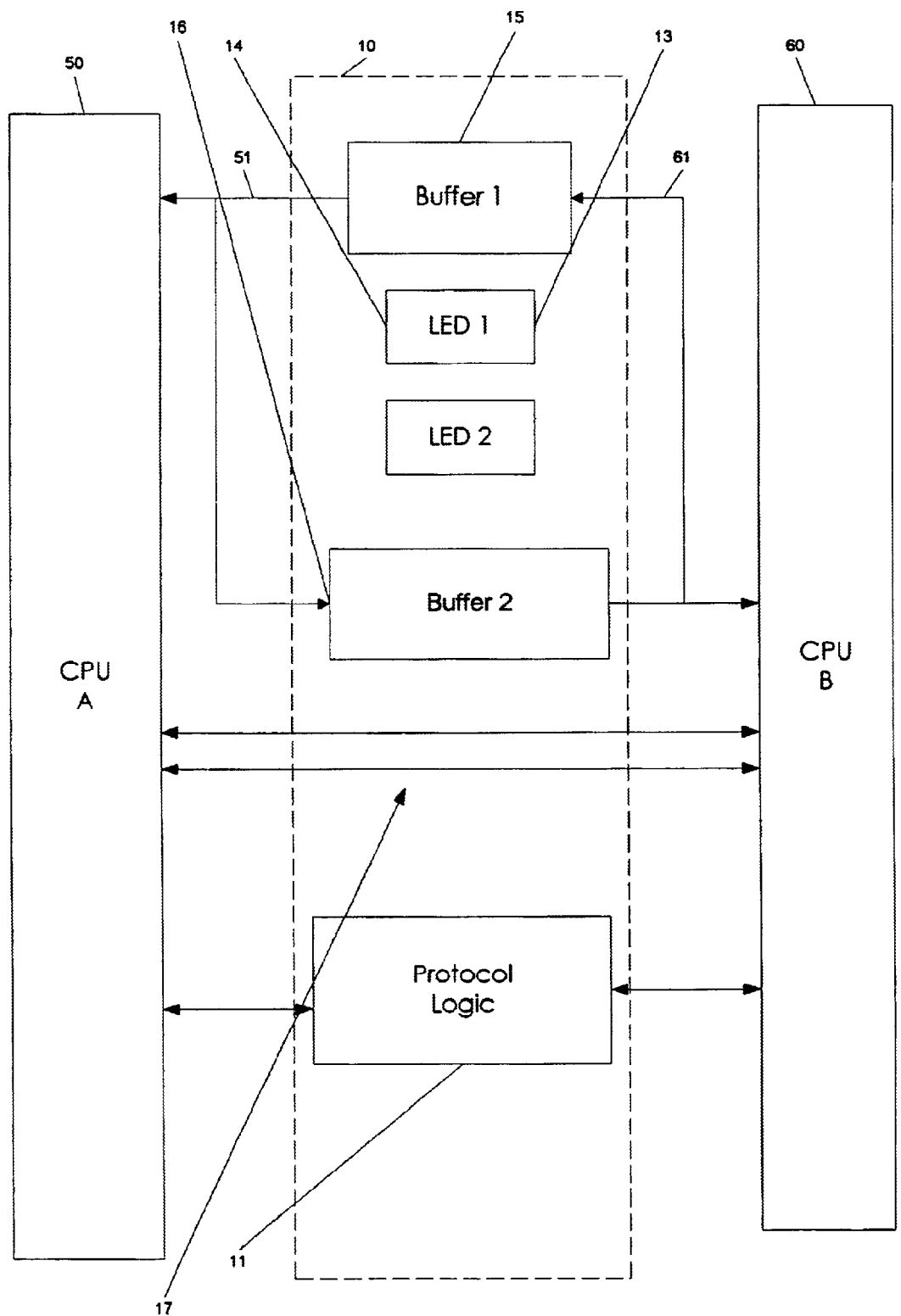
FIG. 1 is a block diagram of a processor bus bridge in accordance with the principles of the invention.

The invention provides a low cost, high performance interface between the buses of two dissimilar microprocessors. Interprocessor communication modes such as polled, interrupt, or direct memory access (DMA) are modes in which either processor can operate. DMA involves the transfer of data from a computer memory to some other location, without the intervention of the central processor unit. DMA is therefore a very desirable approach to interprocessor communication because it reduces the overhead associated with the communication for both processors. Generally, the bus bridge of the present invention provides a gateway between two different buses and allows operation utilizing DMA on both sides of the bridge.

Specifically, FIG. 1 indicates the preferred embodiment of the invention as implemented between first processor 50 and a dissimilar second processor 60. A processor bus bridge 10 has a buffer space and a protocol logic module 11. The buffer space is disposed between and connected with a first bus 51 and a second bus 61. The first bus 51 is operated in a first mode by processor 50 while the second bus 61 is operated in a second mode by processor 60. Each operation mode can involve a logical structure which is unique to that mode, or the modes can be the same. For example, the preferred embodiment provides a gateway between a Hitachi SH-3 processor bus and a Multimedia processor using the Peripheral Component Interconnect (PCI) bus. An important feature of the invention provides that the first mode can have a protocol which is different from the second mode, while at the same time, the first bus can have electrical structure which is different from the second bus.

The protocol logic module 11 is disposed between first processor 50 and second processor 60. The module 11 controls data transfer across the buffer space in the aforementioned first and second modes. Preferably, the buffer space has a first buffer 15 and a second buffer 16. Each buffer supports communication in one direction. For example, in the preferred embodiment the first buffer 15 supports communication from first processor 50 to second processor 60, whereas the second buffer 16 supports communication in the opposite direction. Each buffer is mapped into the memory space of processors 50 and 60. This allows for fast and efficient DMA operation of either or both of the processors 50 and 60.

The invention also has diagnostic indicators 13 and 14, which are shown as LED's 1 and 2, for providing information on violations in processor communication protocol. As such, the first diagnostic indicator 13 is connected to the first buffer 15, while the second diagnostic indicator 14 is connected to the second buffer 16. Essentially, each indicator illuminates when its respective buffer has data. The bridge 10 also provides for a status information interface 17. Interface 17 is disposed between first processor 50 and second processor 60, and enables data transfer between the two processors. Specifically, the lines comprising interface 17 notify one processor what the other processor tends to do using the bridge logic. Interface 17 is an enabling point, therefore, for protocol between the two processors, but is not dependent upon the protocol or processor specifics.

In operation, the invention transfers data between first processor 50 and second processor 60 via the first bus 51, the second bus 61, and the processor bus bridge 10. The bridge 10 operates as a slave device on both buses. For example, the protocol logic module 11 can transfer data across one of the buses in a polled mode and independently transfer data across the other of the buses in a non-polled mode such as interrupt or DMA modes. In the polled mode, each processor must poll the status information to check when the other processor has put data into the buffer. In a typical polling operation, the first processor 50 writes data to the first buffer 15 and second processor 60 polls until the status indicates that first buffer 15 has data. In the present example, since second processor 60 is operating in a non-polled mode, protocol logic module 11 acts as second processor 60 and performs the necessary polling. The first processor 50 then polls until second processor 60 reads the data and first processor 50 then writes the next available data.

The protocol logic module 11 can also direct the transfer of data across one of the buses in an interrupt mode and across the other bus in a non-interrupt mode. In interrupt mode, each processor is interrupted when new data is available and when old data has been read by the other processor. Thus, the protocol logic module 11 of the preferred embodiment issues the necessary interrupts to the processor in interrupt mode in a manner which is transparent to the other processor.

The protocol logic module 11 may further transfer data across one of the buses in a DMA mode and the other bus in a non-DMA mode. In DMA mode, each processor sets up a respective DMA unit to transfer a fixed block size of data. Module 11 signals each DMA unit that a unit of data is ready for transfer. One unit puts data into the bridge while the other unit reads the data out. Once the requested number of data units have been transferred, each DMA unit will generate an IRQ to the respective processor to indicate that the transfer is complete.

Turning now to FIG. 2, the operation of diagnostic indicators 13 and 14 can be better appreciated. Indicators 13 and 14 provide the ability to diagnose common communication protocol errors such as overrun, underrun and not ready to receive. The logic table illustrates the ease in which communication errors can be diagnosed.

The invention has been described with reference to a detailed description of a preferred embodiment for the sake of example only. The scope of the invention is to be determined by proper interpretation of the appended claims.

What is claimed is:

1. A processor bus bridge comprising:
   a buffer space disposed between a first bus and a second bus, said first bus operated in a first mode by a first processor and said second bus operated in a second mode by a second processor, said first mode having a protocol which is different from said second mode and said first bus having an electrical structure which is different from said second bus; and
   a protocol logic module disposed between said first processor and said second processor, said module controlling data transfer across said buffer space in said first and second modes and allowing said first mode of said first processor to operate independently of said second mode of said second processor, wherein said protocol logic module controls data transfer across said first bus in a polled mode and across said second bus in a non-polled mode.

2. The bridge of claim 1 wherein said buffer space comprises:
   a first buffer mapped into a first processor memory space and a second processor memory space; and
   a second buffer mapped into said first processor memory space and said second processor memory space.

3. The bridge of claim 2 further comprising:
   a first diagnostic indicator connected to said first buffer; and
   a second diagnostic indicator connected to said second buffer, said first and second diagnostic indicators providing information on violations in processor communication protocol.

4. The bridge of claim 1 further comprising a status information interface disposed between said first processor and said second processor for enabling data transfer between said first processor and said second processor.

5. A processor bus bridge comprising:
   a buffer space disposed between a first bus and a second bus, said first bus operated in a first mode by a first processor and said second bus operated in a second mode by a second processor, said first mode having a protocol which is different from said second mode and said first bus having an electrical structure which is different from said second bus; and
   a protocol logic module disposed between said first processor and said second processor, said module controlling data transfer across said buffer space in said first and second modes and allowing said first mode of said first processor to operate independently of said second mode of said second processor, wherein said protocol logic module controls data transfer across said first bus in an interrupt mode and across said second bus in a non-interrupt mode.

6. A processor bus bridge comprising:
   a buffer space disposed between a first bus and a second bus, said first bus operated in a first mode by a first processor and said second bus operated in a second mode by a second processor, said first mode having a protocol which is different from said second mode and said first bus having an electrical structure which is different from said second bus; and
   a protocol logic module disposed between said first processor and said second processor, said module controlling data transfer across said buffer space in said first and second modes and allowing said first mode of said first processor to operate independently of said second mode of said second processor, wherein said protocol logic module controls data transfer across said first bus in a direct memory access mode and across said second bus in a non-direct memory access mode.

7. A method for interprocessor communication comprising the steps of:
   operating a first bus in a first mode, said first bus connected to a first processor;
   operating a second bus in a second mode, said second bus connected to a second processor, said first mode having a protocol which differs from said second mode and said first bus having an electrical structure which differs from said second bus; and
   transferring data between said first processor and said second processor via said first bus, said second bus, and a processor bus bridge, wherein said processor bus bridge allows said first mode of said first processor to operate independently of said second mode of said second processor, and wherein said data is transferred across one of said buses in a polled mode and the other of said buses in a non-polled mode.

8. A method for interprocessor communication comprising the steps of:
   operating a first bus in a first mode, said first bus connected to a first processor;

operating a second bus in a second mode, said second bus connected to a second processor, said first mode has a protocol which differs from said second mode and said first bus having an electrical structure which differs from said second bus; and transferring data between said first processor and said second processor via said first bus, said second bus, and a processor bus bridge, wherein said processor bus bridge allows said first mode of said first processor to operate independently of said second mode of said second processor, and wherein said data is transferred across one of said buses in and interrupt mode and the other of said buses in a non-interrupt mode.

9. A method for interprocessor communication comprising the steps of:

operating a first bus in a first mode, said first bus connected to a first processor;

operating a second bus in a second mode, said second bus connected to a second processor, said first mode has a protocol which differs from said second mode and said first bus having an electrical structure which differs from said second bus; and transferring data between said first processor and said second processor via said first bus, said second bus, and a processor bus bridge, wherein said processor bus bridge allows said first mode of said first processor to operate independently of said second mode of said second processor, and wherein said data is transferred across one of said buses in a direct memory access mode and the other of said buses in a non-direct memory access mode.

* * * * *